United States Patent

Furnival

[15] 3,700,969

[45] Oct. 24, 1972

[54] REPAIRABLE SEMICONDUCTOR ASSEMBLY

[72] Inventor: Thomas J. Furnival, Kokomo, Ind.

[73] Assignee: General Motors Corporation, Detroit, Mich.

[22] Filed: Feb. 14, 1972

[21] Appl. No.: 225,740

[52] U.S. Cl. ........................317/40 R, 317/58, 337/3, 337/381

[51] Int. Cl. ................................................H01l 1/12

[58] Field of Search ....337/3, 365, 369, 381; 317/31, 317/40 R, 58

[56] References Cited

UNITED STATES PATENTS

| | | | |
|---|---|---|---|
| 3,014,105 | 12/1961 | Schmitt | 337/381 X |
| 3,164,701 | 1/1965 | Kirchhubel | 337/381 X |
| 3,575,645 | 4/1971 | Doversberger et al. | 317/40 R |

*Primary Examiner*—James D. Trammell
*Attorney*—Jean L. Carpenter et al.

[57] ABSTRACT

A transient suppressor for an electronic circuit includes a hermetically sealed housing for a Zener diode having a thin thermally conductive cover in thermal engagement with the Zener diode near the junction thereof and a heat dissipating member extending from the diode through the bottom of the package. A thermal circuit breaker seated in the depressed portion of the dish-shaped cover has a temperature responsive element normally in intimate engagement with the cover to sense the diode junction temperature. A base member supporting the diode housing and the circuit breaker carries a leaf spring for biasing the circuit breaker against the diode housing. The spring is removable to allow easy replacement of the diode or the circuit breaker when defective. External circuit connections which may include a fuse, places the circuit breaker in series with the Zener diode to prevent current flow through the diode when the junction temperature reaches a critical point.

3 Claims, 3 Drawing Figures

PATENTED OCT 24 1972 3,700,969

REPAIRABLE SEMICONDUCTOR ASSEMBLY

This invention relates to a semiconductor package and particularly to a self-protective Zener diode package.

In the case where semiconductor elements are utilized in electronic circuits in such a manner that they are subject to large transient voltages, it is desirable to provide a protective device for preventing overload conditions which would destroy the semiconductor. This is especially true in the case of very expensive elements such as power Zener diodes and in the cases where exceptionally high circuit reliability is required. An example of such a protective arrangement is a Power Zener Package as shown in the U.S. Pat. No. 3,575,645 to Doversberger and Furnival. In that disclosure, however, the protective device including a circuit breaker and a fuse are enclosed in a hermetically sealed container along with the Zener diode so that in the event of failure of any one of the three elements, the entire assembly must be replaced. It is desirable therefore to provide a repairable semiconductor package in which any one of the elements may be replaced without discarding those elements which remain intact.

It is therefore an object of this invention to provide a self-protective semiconductor assembly which is repairable when one of the elements thereof becomes defective.

It is a further object of this invention to provide a repairable self-protective semiconductor assembly of small size and light weight.

The invention is carried out by providing a semiconductor within a hermetically sealed housing wherein the housing cover has a thin section and is in intimate thermal engagement with the semiconductor near the junction thereof, and a thermal circuit breaker outside the housing having a temperature responsive element in contact with the cover to sense and respond to the semiconductor junction temperature. A spring biasing arrangement secures the circuit breaker to the semiconductor housing. The invention further contemplates that the semiconductor be a Zener diode having a heat sink connected thereto and extending through the housing into engagement with a base member and the spring biasing arrangement including a leaf spring supported by the base member and engaging the circuit breaker to bias the circuit breaker and the housing against the base plate.

The above and other advantages will be made more apparent from the following specification taken in conjunction with the accompanying drawings wherein like reference numerals refer to like parts and wherein.

Figure 1:
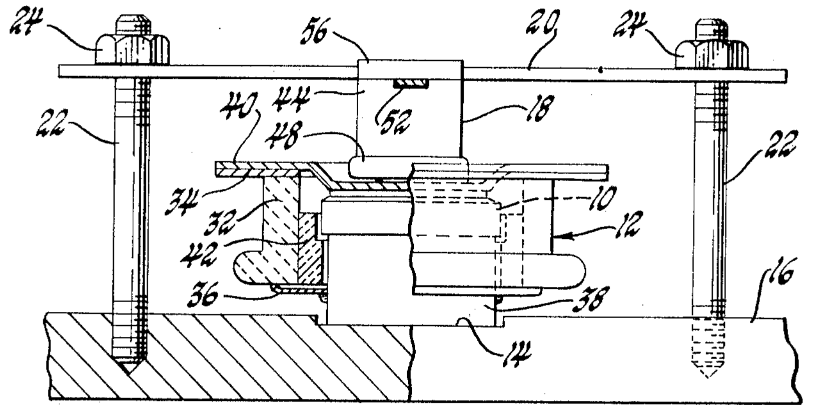
FIG. 1 is a cross-sectional view of the semiconductor assembly according to the invention.
Figure 2:
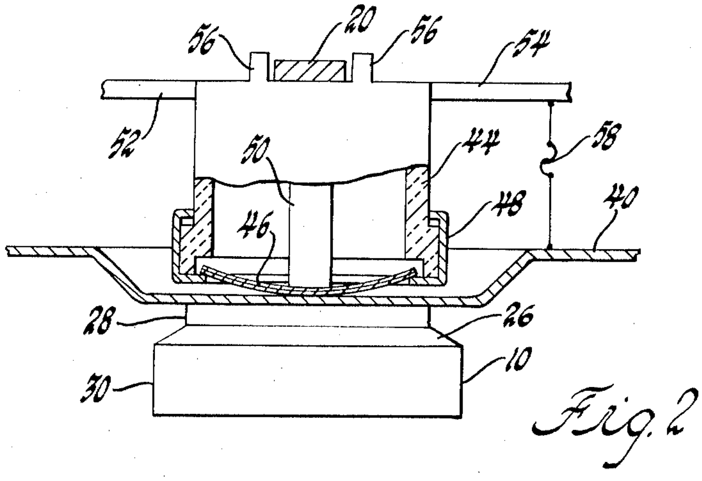
FIG. 2 is a partly broken away view of a portion of the assembly of FIG. 1 revealing a detail of the circuit breaker and its relationship to the semiconductor.

Referring to FIGS. 1 and 2, the invention comprises a Zener diode 10 within a housing 12 which is nested in a depression 14 in a base plate 16. A thermal circuit breaker 18 is supported atop the housing 12 and is retained by a leaf spring 20 which is carried by a pair of mounting studs 22, one near each end of the leaf spring. Each stud is threadably fastened to the base plate 16 and passes through an aperture in the leaf spring 20. Nuts 24, threaded on the studs, secure the spring thereto and adjustably stress the spring to apply the desired axial load on the circuit breaker 18 and the housing 12 against the base plate 16 to retain the parts in assembly. It is apparent that by removing the nuts, the housing and the circuit breaker can be removed individually for replacement in the event one of them is defective.

The Zener diode cell, as best shown in FIG. 2, comprises a semiconductor diode 26 incorporating a PN junction, and is sandwiched between a thin upper plate 28 and a thick heat dissipating lower plate 30. The housing 12 for the Zener diode includes an annular ceramic side wall 32 with upper and lower metal flanges 34 and 36 partially embedded therein. The lower flange 36 is welded to the side of a cylindrical heat sink 38 which has its upper end in contact with the plate 30 of the Zener cell and its lower end extending beyond the flange 36. A dish-shaped cover 40 having a depressed central portion has its outer rim fitting against the flange 34 and is cold-welded thereto to complete the cell assembly. The central depressed portion of the cover 40 is in intimate thermal contact with the upper plate 28 of the Zener cell and applies an axial force thereto so that the Zener cell is retained between the cover 40 and the heat sink 38 by pressure and no brazed joints are required. An annular insulating spacer 42 between the ceramic wall 32 and the Zener cell 10 centrally locates the Zener cell within the housing during assembly. The cover 40 is formed of a sheet of copper 0.005 to 0.010 inch thick. Thus, due to the thinness of the cover and its thermal intimacy with the semiconductor junction, the temperature of the cover will very closely follow the junction temperature.

As shown in FIG. 2, the circuit breaker includes a housing 44 of insulating material having a snap action bimetallic element 46 which is held at its edge by a retaining ring 48. At normal temperatures, the bimetallic temperature responsive element 46 is in thermal contact with the cover 40 so that the element 46 is essentially responsive to the semiconductor junction temperature. When a predetermined junction temperature has been reached, the element 46 will snap upwardly to operate switch contacts, not shown, through a rod 50 of insulating material. Thus, the circuit breaker opens at a predetermined temperature and, after a time delay when cooling has occurred, the element 46 will snap back to its initial position in contact with the cover 40. Electrical input and output tabs 52 and 54 are provided on the circuit breaker for connection to the electrical circuit in which the assembly is utilized. A pair of ridges 56 atop the circuit breaker housing provide a nest for the leaf spring 20. In the preferred embodiment, a fuse 58 is connected between the output tab 54 of the circuit breaker and the cover 40 of the semiconductor housing, the cover forming the positive terminal for the Zener housing. The heat sink 38, of course, serves as the negative terminal for the Zener cell.

Figure 3:
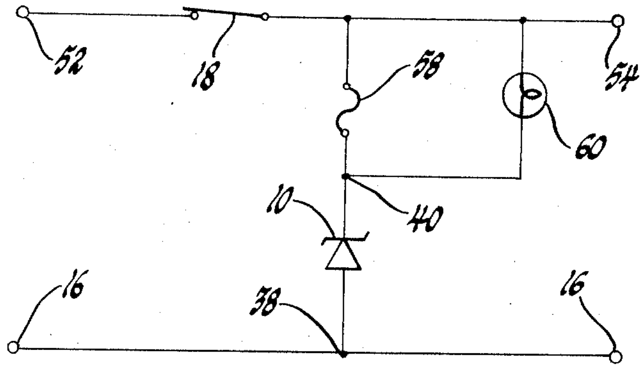
FIG. 3 is a schematic circuit in which the assembly may be utilized.

The circuit shown schematically in FIG. 3 corresponds to the structure of FIGS. 1 and 2 wherein the tab 52 and the base plate 16 form the input terminals to the assembly and the tab 54 and the base plate 16 form the output terminals which in practice would be connected to a load circuit. Normally, the input and output tabs 52,54 are directly connected by the closed circuit breaker 18. However, when the Zener diode temperature approaches a critical value, the circuit breaker 18 opens to remove the input voltage from both the Zener diode and the output terminal 54. The fuse 58 in series with the Zener diode provides additional protection against excess current. An indicator lamp 60 in parallel with the fuse 58 is optionally provided to indicate when the fuse has opened. It is obvious that the fuse 58 may be otherwise located or other external circuit connections can be made to provide alternative circuit configurations; for example, one in which the circuit breaker is in series with the diode, but is not in the output circuit.

The semiconductor assembly according to this invention is easily repaired since either a defective circuit breaker or diode may be readily replaced without requiring replacement of the entire package. In addition, the assembly is lighter and smaller in size than other power Zener packages of similar purpose. The ease of design and the reliability of the assembly is enhanced by the elimination of the braze joints to the Zener cell.

The embodiment of the invention described herein is for purposes of illustration and the scope of the invention is intended to be limited only by the following claims:

It is claimed:

1. A self-protective semiconductor assembly comprising a hermetically sealed semiconductor device including a housing having a thin thermally conductive member and an opposing heat sink member, and a semiconductor cell between the members in intimate thermal contact therewith, the semiconductor junction being near the thin member, a thermally responsive circuit breaker mounted externally of the housing and including a temperature responsive element normally in intimate thermally conductive engagement with the thin member so that the element is responsive to the semiconductor junction temperature for opening the circuit breaker when the junction temperature reaches a critical value, means for electrically connecting the circuit breaker in series with the semiconductor for preventing current flow through the semiconductor when the junction temperature is at the critical level, and removable spring means for biasing the circuit breaker against the semiconductor device for maintaining the integrity of the assembly.

2. A self-protective semiconductor assembly comprising a hermetically sealed semiconductor device including a housing having a thin thermally conductive member and an opposing heat sink member, and a semiconductor cell between the members in intimate thermal contact therewith, the semiconductor junction being near the thin member, a thermally responsive circuit breaker mounted externally of the housing and including a temperature responsive element normally in intimate thermally conductive engagement with the thin member so that the element is responsive to the semiconductor junction temperature for opening the circuit breaker when the junction temperature reaches a critical value, means for electrically connecting the circuit breaker in series with the semiconductor for preventing current flow through the semiconductor when the junction temperature is at the critical level, and a base member supporting the semiconductor device, spring support means secured to the base and a leaf spring removably attached to the support means and bearing on the circuit breaker to apply a force through the circuit breaker and the semiconductor device to the base.

3. A self-protective Zener diode assembly comprising a hermetically sealed diode device including a housing having a thin thermally conductive dish-shaped member having a central depressed portion and an opposing heat sink member, and a Zener diode between the members in intimate thermal contact therewith, the Zener diode junction being near the depressed portion of the thin member, a thermally responsive circuit breaker mounted externally of the housing and seated within the depressed portion and including a temperature responsive element normally in intimate thermally conductive engagement with the thin member so that the element is responsive to the Zener diode junction temperature for opening the circuit breaker when the junction temperature reaches a critical value, means for electrically connecting the circuit breaker in series with the Zener diode for preventing current flow through the Zener diode when the junction temperature is at the critical level, a removable spring means for biasing the circuit breaker against the diode device for maintaining the integrity of the assembly.

* * * * *